Patented Apr. 8, 1930

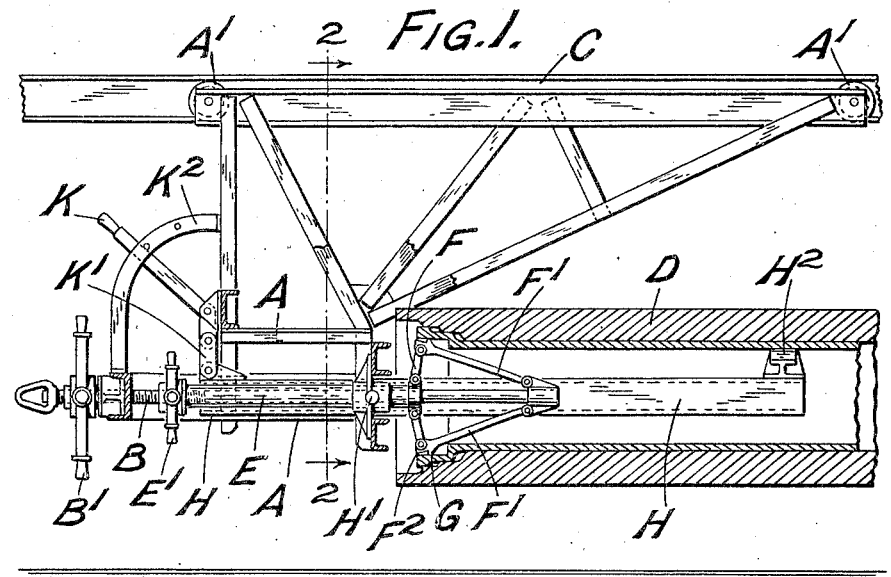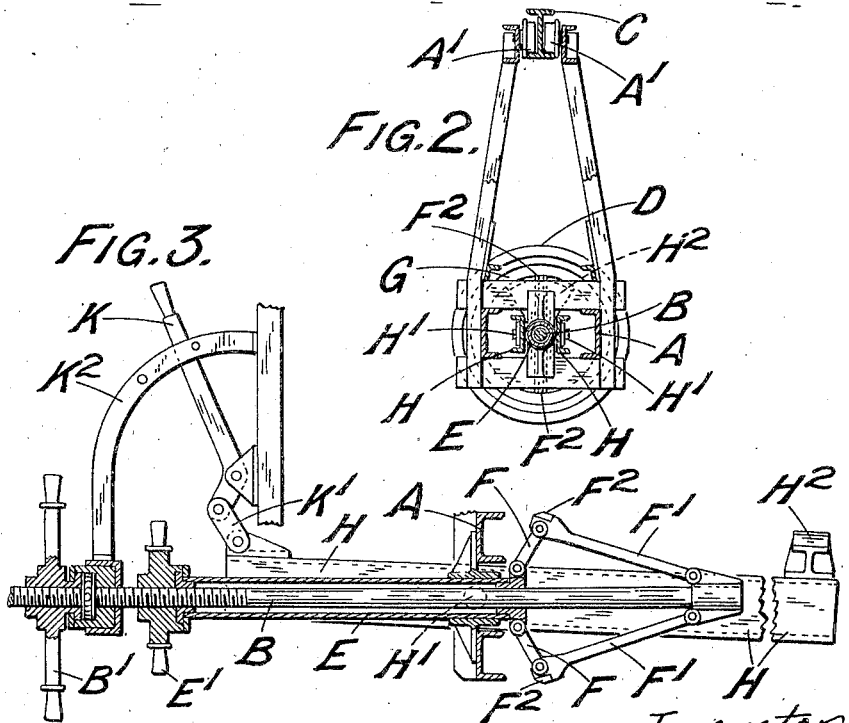

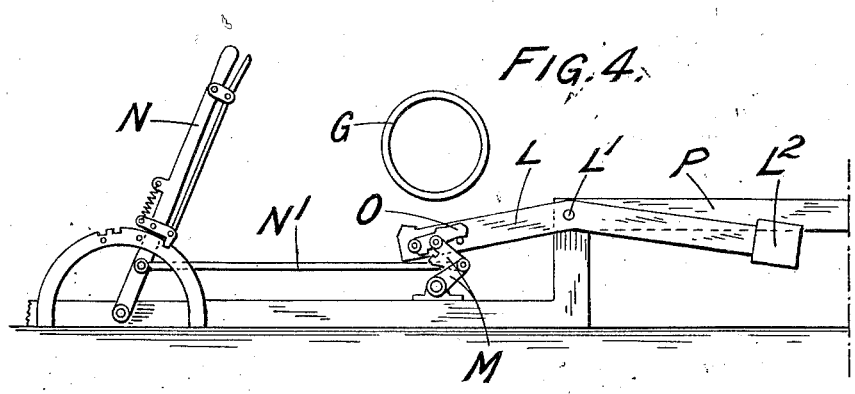
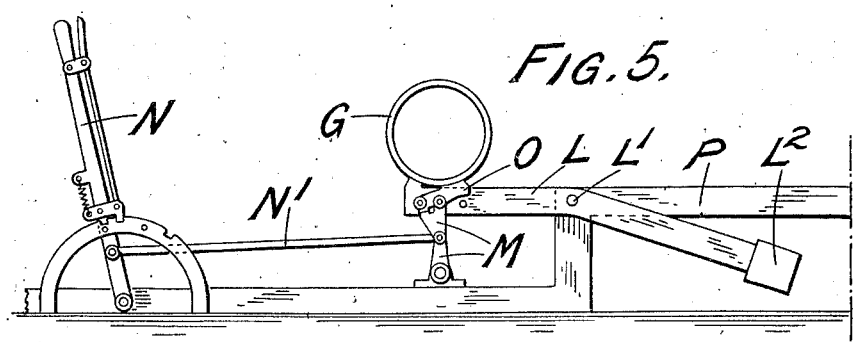
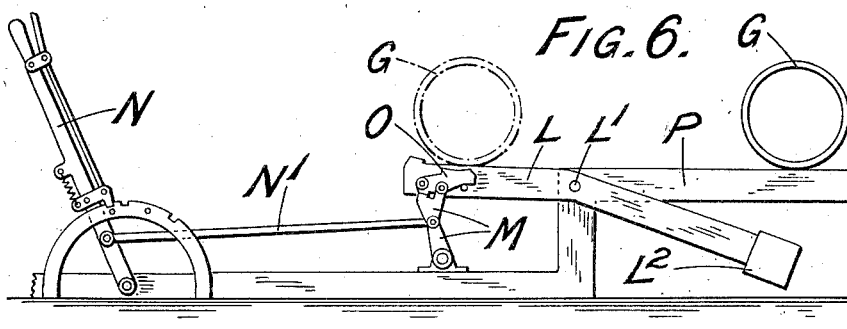

1,754,106

UNITED STATES PATENT OFFICE

JAMES EDGAR HURST, OF THORNCLIFFE, NEAR SHEFFIELD, ENGLAND, AND EDMUND BRUCE BALL, OF KILMARNOCK, SCOTLAND, ASSIGNORS TO CENTRIFUGAL CASTINGS LIMITED, OF KILMARNOCK, SCOTLAND, A REGISTERED COMPANY OF GREAT BRITAIN

APPARATUS FOR EXTRACTING PIPES AND LIKE CYLINDRICAL ARTICLES FROM THE MOLDS IN WHICH THEY ARE CAST

Application filed December 3, 1928, Serial No. 323,465, and in Great Britain January 17, 1928.

This invention relates to apparatus for extracting pipes and like cylindrical articles from the molds in which they are cast and has for its object to provide an improved and simplified construction of apparatus for this purpose and for discharging the pipes after they have been extracted. The invention is particularly applicable to pipes produced in centrifugal casting machines.

According to this invention a framework, preferably forming part of an overhead traveller, is provided with a supporting member carrying an expansible pipe gripping device and means whereby the gripping device can be moved as a whole in a longitudinal direction relatively to the frame and to the longitudinal axis of the mold. With such an arrangement the traveller, which is preferably of the overhead type, is first moved so that the gripping device lies within the bore of the pipe, whereupon, after the gripping device has been expanded to engage the pipe, the supporting member and the pipe engaged by the gripping device are moved in an axial direction as a unit relatively to the frame of the traveller so as to free the pipe from the mold.

The frame is preferably also furnished with an extension or jib adapted to support the bore of the pipe at a point between its ends, this jib being actuated by lever mechanism or the like on the frame which is brought into operation after the pipe has been freed from the mold but before it has been withdrawn therefrom. When the pipe is supported by means of the jib as well as at its end by means of the gripping device, the travelling frame, together with the support and its associated mechanism, is moved as a whole in a longitudinal direction away from the mold thus withdrawing the pipe therefrom.

After the pipe has been extracted in the manner described, it is preferably discharged on to a cradle which is temporarily depressed while the pipe passes over it, but is furnished with operating mechanism enabling it also to occupy a supporting position to take the weight of the pipe when the extractor has been removed therefrom and with a discharge mechanism by means of which the table is tilted or trip mechanism thereon is actuated allowing the pipe to roll down a suitable incline to a truck, conveyer or the like.

One construction according to this invention is illustrated somewhat diagrammatically by way of example in the accompanying drawings, in which—

Figure 1 is a sectional side elevation showing the extracting device in place within the mold;

Figure 2 is a cross-section on the line 2—2 of Figure 1;

Figure 3 is a sectional side elevation of the toggle mechanism disengaged from the pipe;

Figure 4 is an end elevation of the unloading cradle in its initial position;

Figure 5 shows the cradle raised and supporting the pipe after its removal from the extracting mechanism, and Figure 6 is a similar view showing the cradle from which the pipe has just been discharged.

The extracting apparatus comprises a rectangular frame A having bearings to support a horizontal screwthreaded shaft B, the frame being mounted upon wheels $A^1$ to travel along an overhead runway C extending in a direction parallel to the length of the mold indicated at D.

The screwthreaded shaft B forms a supporting member for a sleeve E concentric therewith, these elements carrying at their ends nearest the mold D toggle links F $F^1$ provided with gripping members $F^2$ which can be forced into engagement with the bore of the pipe socket G when the sleeve E is moved longitudinally relatively to the screwthreaded shaft B by means of a hand wheel $E^1$.

The hand wheel $E^1$ causes the screwthreaded shaft to move in an axial direction upon the screwthreaded supporting member so as to straighten the toggles from the position shown in Figure 3 into the position shown in Figure 1 and thus expand the gripping devices $F^2$ into engagement with the inner walls of the pipe socket. This movement of the toggles takes place without any longitudinal movement of the extractor as a whole upon its runway C.

The screwthreaded shaft B carries a second extractor operating hand wheel B¹ by means of which the shaft, together with the sleeve and the toggle mechanism, is moved in a longitudinal direction relatively to the frame A, thus enabling the pipe G to be freed from its mold from which it is withdrawn a few inches into the position shown in Figure 1. During this initial extracting operation there is no movement of the wheels A¹ upon the runway C to which the frame may be temporarily locked by any suitable known means.

After the pipe G has been freed from the mold D to the extent above described, a jib or like member H mounted upon a horizontal pivot H¹ in the frame is swung from the position shown in Figure 3 into alignment with the sleeve, i. e. the position shown in Figure 1, so that a supporting shoe H² at the free end of this jib is lifted from the inclined position shown in Figure 3 to engage the bore of the pipe at a point about midway in its length. Thus the pipe is supported not only by the gripping members F² at its socket end but midway in its length. The jib H is connected by a link K¹ to an actuating lever K pivotally mounted to the rear end of the frame A and moving over a quadrant K².

When the parts occupy the position shown in Figure 1, the apparatus can be moved as a whole along the runway C until the pipe is wholly withdrawn from the mold D. The pipe G remains supported by the extracting device until it is over a receiving cradle L which is then in the depressed position shown in Figure 4. The cradle L is mounted upon horizontal pivots L¹ and is supported by toggle members M the common pivot of which is connected by a rod N¹ to an actuating lever N. Further, the upper toggle arm M is connected to a pivot stop O which is inoperative when the parts occupy the position shown in Figure 4. After the pipe has been brought over the depressed cradle as shown in Figure 4, the lever N is moved into its intermediate position straightening the toggle arms M and raising the stop O which thus prevents any tendency for the pipe G to roll or move relatively to the cradle. When the parts occupy the position shown in Figure 5 the hand wheel E¹ is moved to release the gripping members F², the jib H is lowered into the position shown in Figure 3, and the whole frame A and the parts it carries are moved along the runway clear of the pipe. The lever N is then moved into the third position shown in Figure 6, thus releasing the catch O on the cradle L and permitting the pipe to roll on to a receiving platform, conveyer, truck or the like P.

In the particular construction illustrated the cradle L is provided with a counterweight L² so that it will easily rock upon its horizontal pivot L¹, but it will be understood that the retaining device or stop on the cradle and the means for actuating this so as to permit the pipe to roll on to a receiving platform or truck can be varied and other constructional details of the mechanism altered without departing from this invention.

What we claim as our invention and desire to secure by Letters Patent is:—

1. In apparatus for extracting cylindrical articles from the molds in which they are cast, the combination of a frame mounted to travel in a longitudinal direction relatively to the mold, a supporting member on the frame, an expansible gripping device on said member, means for expanding and contracting the gripping device and means for moving the supporting member and gripping device in a longitudinal direction relatively to the frame after the gripping device has been expanded to engage the cylindrical casting.

2. In apparatus for extracting cylindrical articles from the molds in which they are cast, the combination of a frame mounted to travel in a longitudinal direction relatively to the mold, a supporting member mounted on the frame, an expansible gripping device on said member, means for expanding and contracting the gripping device, means for moving the gripping device and support as a unit in a longitudinal direction relatively to the frame, a jib mounted on the frame and extending into the bore of the cylindrical casting, a supporting shoe at the free end of the jib, and means for moving the jib so as to bring the shoe into engagement with the bore of the cylindrical casting at a point between the ends thereof.

3. In apparatus for extracting cylindrical articles from the molds in which they are cast, the combination of a travelling frame, a supporting member carried thereby, a gripping device for the casting on the support, screwthreaded means for expanding and contracting the gripping device and means for moving the support and gripping device as a unit in a longitudinal direction relatively to the frame so as to effect the initial extraction of the casting from its mold.

4. In apparatus for extracting cylindrical articles from the molds in which they are cast, the combination of a travelling frame, a supporting member carried thereby, a gripping device for the casting on the support, screwthreaded means for expanding and contracting the gripping device, means for moving the support and gripping device as a unit in a longitudinal direction relatively to the frame so as to effect the initial extraction of the casting from its mold, a jib mounted on the frame and extending into the bore of the cylindrical casting, a supporting shoe at the free end of the jib, and means for moving the jib so as to bring the shoe into engagement with the bore of the cylindrical casting at a point between the ends thereof after the initial extraction of the casting and before the frame is caused to travel away from the mold.

5. In apparatus for extracting cylindrical articles from the molds in which they are cast, the combination of a frame adapted to travel in a longitudinal direction relatively to the mold, a supporting member carried thereby including a horizontal screwthreaded member, a second screwthreaded member mounted on the first screwthreaded member, toggle members mounted on the second screwthreaded member, gripping devices for the casting on said toggles, means for moving the second screwthreaded member upon the first screwthreaded member to expand or contract the toggles, and means for moving the first screwthreaded member in a longitudinal direction relatively to the frame so as to effect the initial extraction of the casting from the mold before the frame is caused to travel away from the mold.

6. In apparatus for extracting cylindrical articles from the molds in which they are cast, the combination of a frame adapted to travel in a longitudinal direction relatively to the mold, a supporting member carried thereby including a horizontal screwthreaded member, a second screwthreaded member mounted on the first screwthreaded member, toggle members mounted on the second screwthreaded member, gripping devices for the casting on said toggles, means for moving the second screwthreaded member upon the first screwthreaded member to expand or contact the toggles, means for moving the first screwthreaded member in a longitudinal direction relatively to the frame so as to effect the initial extraction of the casting from the mold before the frame is caused to travel away from the mold, a jib extending into the cylindrical casting pivotally mounted on the frame, a shoe at the free end of the jib, and means for moving the shoe into engagement with the bore of the cylindrical casting at a point between the ends thereof and for locking the shoe in such engaged position prior to the frame and casting being caused to travel away from the mold.

In testimony whereof we have signed our names to this specification.

JAMES EDGAR HURST.
EDMUND BRUCE BALL.